(12) United States Patent
Donini et al.

(10) Patent No.: US 11,449,068 B2
(45) Date of Patent: Sep. 20, 2022

(54) MOBILE WORK MACHINE STATE DETECTION AND VISUALIZATION SYSTEM

(71) Applicant: Deere & Company, Moline, IL (US)

(72) Inventors: Mario L. Donini, Bettendorf, IA (US); Troy K. Maddox, LeClaire, IA (US); Joshua D. Hoffman, Bettendorf, IA (US); Margaux M. Ascherl, Adel, IA (US)

(73) Assignee: Deere & Company, Moline, IL (US)

( * ) Notice: Subject to any disclaimer, the term of this patent is extended or adjusted under 35 U.S.C. 154(b) by 201 days.

(21) Appl. No.: 16/871,294

(22) Filed: May 11, 2020

(65) Prior Publication Data

US 2021/0349466 A1 Nov. 11, 2021

(51) Int. Cl.
*G05D 1/02* (2020.01)
*B62D 33/06* (2006.01)
*B62D 49/06* (2006.01)
*E02F 9/16* (2006.01)
*E02F 9/20* (2006.01)
*E02F 9/26* (2006.01)
(Continued)

(52) U.S. Cl.
CPC .......... *G05D 1/0231* (2013.01); *B62D 33/06* (2013.01); *B62D 33/0625* (2013.01); *E02F 9/16* (2013.01); *E02F 9/205* (2013.01); *E02F 9/26* (2013.01); *B60P 1/04* (2013.01); *B62D 49/06* (2013.01); *E02F 3/283* (2013.01); *E02F 3/32* (2013.01)

(58) Field of Classification Search
CPC .......... G05D 1/0231; E02F 3/283; E02F 3/32; E02F 9/16; E02F 9/205; E02F 9/26; E02F 9/262; B62D 33/06; B62D 33/0625; B62D 49/06; B60Q 1/50; A01B 69/008; B60P 1/04
See application file for complete search history.

(56) References Cited

U.S. PATENT DOCUMENTS 9,475,422 B2 10/2016 Hillis et al.
9,849,828 B2 * 12/2017 Foster ................. G07C 5/0825
(Continued)

FOREIGN PATENT DOCUMENTS

WO WO2019116806 A1 6/2019
WO WO2019155745 A1 8/2019

OTHER PUBLICATIONS

Extended European Search Report and Written Opinion issued in European Patent Application No. 21169771.9, dated Oct. 21, 2021, in 14 pages.
(Continued)

*Primary Examiner* — Tyler J Lee
(74) *Attorney, Agent, or Firm* — Christopher J. Volkmann; Kelly, Holt & Christenson, PLLC

(57) ABSTRACT

A mobile work machine includes an operator compartment having an operator interface mechanism configured to receive operator input, a control system configured to generate a control signal to control the mobile work machine in an unmanned operation mode, a machine state detection system configured to detect a machine state of the mobile work machine in the unmanned operation mode, and a visualization system configured to control a visual indicator mechanism in the operator compartment to generate a visual indication of the detected machine state.

20 Claims, 13 Drawing Sheets

(51) Int. Cl.
*B60P 1/04* (2006.01)
*E02F 3/28* (2006.01)
*E02F 3/32* (2006.01)

(56) References Cited

U.S. PATENT DOCUMENTS

| | | | | |
|---|---|---|---|---|
| 2007/0293989 | A1* | 12/2007 | Norris | G05D 1/0088 700/249 |
| 2015/0199847 | A1* | 7/2015 | Johnson | G02B 27/017 345/633 |
| 2017/0140651 | A1* | 5/2017 | Lee | G01C 21/365 |
| 2018/0179732 | A1* | 6/2018 | Bartsch | E02F 9/205 |
| 2018/0264940 | A1* | 9/2018 | Torii | G06V 20/58 |
| 2018/0264944 | A1* | 9/2018 | Torii | G02B 27/0101 |
| 2020/0018045 | A1 | 1/2020 | Sano et al. | |

OTHER PUBLICATIONS

"What Do the Lights on Your Echo Device Mean?", Retrieved at <https://www.amazon.com/gp/help/customer/display.html?nodeId=201601790>, Retrieved on Apr. 23, 2020, 3 pages.

"Light towers", Retrieved at: ,https://www.google.com/search?safe=active&rlz=1C1GCEA_enUS840US842&biw=1818&bih=889&tbm=isch&sa=1 &ei=NbLKXf6_NI-EtQX9npHQDw&q=factory+signal+tower+safety&oq=factory+signal+tower+safety&gs_l=img. 12... 10693. 13664.. 16137...0.0..0. 135. 1146.4j7......0....1..gws-wiz-img.95e4j_WXkll&ved=0ahUKEwi-rpmu4uTIAhUPQq0KHX1PBPoQ4dUDCAc#imgrc=iyooXNwCz6ix3M:>Retrieved on Apr. 23, 2020, 1 page.

\* cited by examiner

MOBILE WORK MACHINE STATE DETECTION AND VISUALIZATION SYSTEM

FIELD OF THE DESCRIPTION

The present description generally relates to mobile work machines. More specifically, but not by limitation, the present description relates to a control system for detecting and visualizing state of a mobile work machine.

BACKGROUND

There are many different types of mobile work machines. Some examples include, but are not limited to, agricultural machines, construction machines, turf management machines, forestry machines, among others. Many of these pieces of mobile equipment have controllable subsystems, that include mechanisms that are controlled by the operator in performing operations. For instance, a mobile work machine can have multiple different mechanical, electrical, hydraulic, pneumatic and electro-mechanical subsystems, among others.

The discussion above is merely provided for general background information and is not intended to be used as an aid in determining the scope of the claimed subject matter.

SUMMARY

A mobile work machine includes an operator compartment having an operator interface mechanism configured to receive operator input, a control system configured to generate a control signal to control the mobile work machine in an unmanned operation mode, a machine state detection system configured to detect a machine state of the mobile work machine in the unmanned operation mode, and a visualization system configured to control a visual indicator mechanism in the operator compartment to generate a visual indication of the detected machine state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 11-1 and 11-2 (collectively referred to as FIG. 11) are a flow diagram illustrating an example operation of an unmanned machine state system.

DETAILED DESCRIPTION

Figure 1:
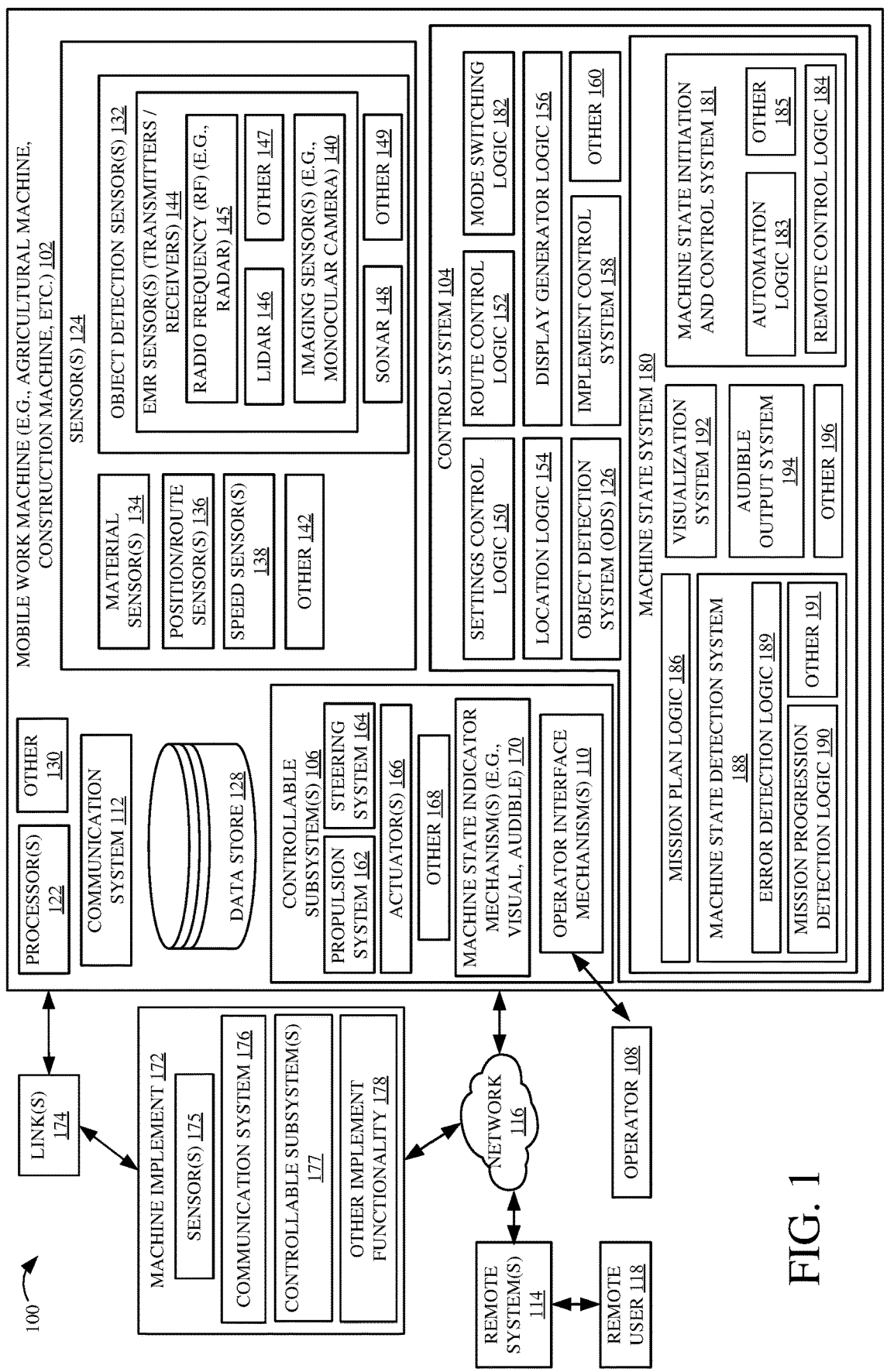
FIG. 1 is a block diagram showing one example of a work machine architecture that includes a mobile work machine.

Mobile work machines operate on worksites that are often complicated, sometimes with many other work machines and workers performing many different operations at any given time. Further, as noted above, a mobile work machine can have multiple different mechanical, electrical, hydraulic, pneumatic and electro-mechanical subsystems, among others, all of which can be operated by an operator, sitting in an operator cab or other compartment of the machine, using a set of operator interface mechanisms. Alternatively, or in addition, the machine (or subsystem(s) of the machine) can be automated or operated autonomously, in which some or all operations of the machine (or subsystem(s)) can be initiated and/or controlled by the machine control system automatically (e.g., without operator input). This can occur with the operator sitting in the operator compartment. Also, the mobile work machine can be configured to operate in an unmanned mode, in which the operator is not physically present in the operator compartment. For example, the operator can place the machine (or particular subsystem(s) of the machine) an autonomous mode in which the machine (or subsystem(s)) operates with little, if any, operator involvement. For instance, the machine can be programmed with a mission plan that defines a set of actions and/or a corresponding action sequence in which the actions are to be performed. The machine carries out the mission plan through autonomous control of the various systems and actuators of the machine.

In another example of an unmanned mode, the operator exits the operator compartment and utilizes remote control logic, for example using a wireless handheld transmitter to provide commands to the machine while the operator stands outside the machine on the worksite. For instance, the operator can use remote controls to raise and lower a bucket or dump body, move the machine forward or backward, control implements attached to the machine, or any of a wide variety of other operations.

However, in some instances, human bystanders (including the operator and/or other workers on the worksite) may be unaware of the current state of the machine (e.g., whether it is active, working to execute the mission, has encountered a problem or issue that affects operation of the machine, etc.) and/or future states or state transitions that the machine is about to enter. In some situations, this can create unsafe or dangerous conditions for the operator and/or other workers. Additionally, the inability for the operator to understand the machine state can result in inefficiencies in executing the mission plan.

The present description provides a system for detecting and visualizing machine states (e.g., automated states, unmanned states, etc.) of a mobile work machine during operation on a worksite. In described examples, a machine state system detects a state of the machine and controls an indicator mechanism to communicate state information to the operator as well as other workers that may be on the worksite in proximity to the machine. The indicator mechanism can include a visual indicator mechanism located in the operator compartment of the machine. Accordingly, the visual indicator mechanism is at a location that would typically be occupied by the operator if the operator were present in the compartment (i.e., in control of the machine during manned operation), which can increase visibility to a human bystander. That is, the visual indicator mechanism is positioned where the human bystander would normally look for visual communication with the operator in the operator compartment.

For the sake of the present discussion, the operator compartment of the machine refers to the area of the machine that the operator is typically operating the machine in, during normal operation of the machine. An operator compartment can be at least partially enclosed, such as including at least a roof and/or windows that surround the operator. However, in some examples, an operator compartment can be open to the environment (e.g., it does not include a roof and/or windows).

It is noted that while examples are discussed herein in the context of an unmanned machine mode (in which the operator is not physically present in the operator compartment), the present features can be utilized during manned operation to visualize automated or autonomous states. For instance, while the operator is seated in the operator compartment, subsystem(s) of the machine can be controlled automatically, and these machine states can be visualized to bystanders on the worksite outside the operator compartment.

FIG. 1 is a block diagram showing one example of a work machine architecture 100 that includes a mobile work machine 102 (such as an agricultural machine, a construction machine, etc., examples of which are discussed below). Work machine 102 includes a control system 104 configured to control a set of controllable subsystems 106 that perform operations on a worksite. For instance, an operator 108 can interact with and control work machine 102 through operator interface mechanism(s) 110 in an operator compartment. Operator interface mechanism(s) 110 can include such things as a steering wheel, pedals, levers, joysticks, buttons, dials, linkages, etc. In addition, they can include a display device that displays user actuatable elements, such as icons, links, buttons, etc. In an example in which the device is a touch sensitive display, those user actuatable elements can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to work machine 102 through communication system 112. For example, but not by limitation, remote user 118 can receive communications, such as notifications, requests for assistance, etc., from work machine 102 on a mobile device.

FIG. 1 also shows that work machine 102 includes one or more processors 122, one or more sensors 124, an object detection system 126, a data store 128, and can include other items 130 as well. Sensor(s) 124 can include any of a wide variety of sensors depending on the type of work machine 102. For instance, sensors 124 can include object detection sensor(s) 132, material sensors 134, position/route sensors 136, speed sensors 138, worksite imaging sensors 140, and can include other sensors 142 as well.

Material sensors 134 are configured to sense material being moved, processed, or otherwise worked on by work machine 102. Position/route sensors 136 are configured to identify a position of work machine 102 and a corresponding route (e.g., heading) of work machine 102 as it traverses the worksite. Sensors 136 include sensors configured to generate signals indicative of an angle or turn radius of machine 102. This can include, but is not limited to, steering angle sensors, articulation angle sensors, wheel speed sensors, differential drive signals, gyroscopes, to name a few.

Speed sensors 138 are configured to output a signal indicative of a speed of work machine 102. Worksite imaging sensors 140 are configured to obtain images of the worksite, which can be processed to identify objects or conditions of the worksite. Examples of imaging sensor(s) 140 include, but are not limited to, one or more cameras (e.g., a monocular camera, stereo camera, etc.) that obtains still images, a time-series of images, and/or video feed of an area of a worksite. For instance, the field of view (FOV) of the camera can include any area of interest on the worksite. This can include areas above machine 102 and/or around machine 102 on the worksite, such as to the rear of machine 102. The camera(s) can include any suitable image acquisition system including, but not limited to, an area array device such as a charge couple device (CCD) or a complementary metal oxide semi-conductor (CMOS) image device. Further, the camera can be coupled to any suitable optical system to increase or decrease the field of view under control of control system 104. Further still, the camera(s) can be provided with additional illumination, such as a backup light, or dedicated illuminator, such that images can easily be acquired when excavator is operated in low-light conditions. Further still, in one example multiple cameras are used to provide stereo vision. In this way, using stereo vision techniques, three-dimensional imagery and visual odometry can be employed.

Object detection sensors 132 can include electromagnetic radiation (EMR) sensors (e.g., transmitters, receivers, transceiver(s)) 144. Examples of EMR sensors include imaging sensors 140 (discussed above), radio frequency (RF) devices 145 (such as RADAR), LIDAR devices 146, and can include other devices 147 as well. Object detection sensors 132 can also include sonar devices 148, and can include other devices 149 as well.

Control system 104 interacts with data store 128 (e.g., storing or retrieving data), which can store a variety of information, such as information regarding objects and/or terrain of the worksite. Control system 104 includes settings control logic 150, route control logic 152, location logic 154, display generator logic 156, implement control system 158, and it can include other items 160.

Controllable subsystems 106 can include propulsion system 162, steering system 164, one or more different actuators 166 (e.g., that can be used to change machine settings, machine configuration, etc.), and it can include a wide variety of other systems 168. In one example, controllable subsystems 106 also include operator interface mechanism(s) 110, such as display devices, audio output devices, haptic feedback mechanisms, as well as input mechanisms. Some examples are discussed in further detail below.

Also, controllable subsystem(s) 106 include one or more machine state indicator mechanisms 170 configured to provide a visual indication of machine state or state transition. This is discussed in further detail below. Briefly, in one example, mechanisms 170 are configured to communicate (audibly, visually, etc.) a current or future machine state, or a state transition, to a user in proximity to machine 102. For instance, a mechanism 170 can include controllable lights or other illumination devices.

Settings control logic 150 can control one or more of subsystems 106 in order to change machine settings based upon objects, conditions, and/or characteristics of the worksite. By way of example, settings control logic 150 can actuate actuator(s) 170 that change the operation of propulsion system 162, and/or steering system 164.

Route control logic 152 can control steering system 164. By way of example, but not by limitation, if an object is detected by object detection system 126, route control logic 152 can control propulsion system 162 and/or steering system 164 to avoid the detected object. Location logic 154 determines a location of machine 102 on the worksite.

Display generator logic 156 illustratively generates a control signal to control a display device, to generate a user interface display for operator 108. The display can be an interactive display with user input mechanisms for interaction by operator 108.

Object detection system 126 is configured to receive signals from object detection sensor(s) 132 and, based on those signals, detect objects proximate machine 102 on the worksite, such as in a path of machine 102.

Implement control system 158 is configured to control a machine implement 172 connected to, or otherwise associated with, machine 102. For example, machine 102 can include a towing or support vehicle that is towing implement 172. Machine 102 is attached or connected to implement 172 by one or more links 174. Alternatively, or in addition, implement 172 can communicate through network 116.

Links 174 can include mechanical links, a hydraulic link that provides hydraulic fluid under pressure, an electronic link (such as a wire or wire harness assembly, or a wireless link) that carries electronic information, a power takeoff, or other mechanical, electrical, hydraulic, wireless, wired or wireless links or other links. In an agricultural example, machine 102 is a tractor, while implement 172 is an actuatable bucket, loader, dump trailer, etc. This is just an example, and machine 102 and implement 172 can be a wide variety of other items as well.

Implement 172 illustratively includes one or more sensors 175, communication system 176, a set of controllable subsystems 177, and it can include a wide variety of other implement functionality 178. It will also be noted that implement 172 can include a control system which, itself, generates control signals to control the controllable subsystems 177 based upon inputs from sensors 175 and from machine 102 (received over links 174). The control system for implement 172 is shown as residing entirely on machine 102, in FIG. 1, for the sake of example only. It will be noted, of course, that the control system for implement 172 can reside on implement 172, or it can be split between machine 102 and implement 172, or it can reside elsewhere.

Control system 104 includes an unmanned machine state system 180. System 180 includes unmanned machine state initiation and control system 181 configured to initiate and control operation of machine 102 in an unmanned mode (e.g., autonomous and/or remotely controlled). For instance, mode switching logic 182 can switch machine 102 from a manned operating mode to an unmanned operating mode in which system 181 is configured to control machine 102 while operator 108 is absent from the operator compartment of machine 102.

Illustratively, system 181 includes automation logic 183, remote control logic 184, and can include other items 185 as well. Automation logic 183 is configured to generate control signals, that can, for example, be used by control system 104 to operator machine 102 in an automated or autonomous mode in which machine 102 follows a mission plan generated or otherwise obtained by mission plan logic 186. A mission plan can define a set of operations, and a sequence of those operations, to be performed by machine 102.

An example automated or autonomous mode includes monitoring, decision-making, and action operations and logic. That is, in a monitoring process, control system 104 monitors the worksite or machine for conditions and other criteria that are utilized in a decision-making process. Control system 104 generates control decisions, based on those worksite or machine conditions. Then, action signals are generated by control system 104 to control machine 102 in accordance with the control decisions.

Remote control logic 184 is configured to operate machine 102 through remote control inputs from operator 108. For instance, operator 108 can utilize a handheld device to transmit signals to remote control logic 184, to control subsystems 106 while physically outside the operator compartment.

System 180 includes machine state detection system 188. System 188 is configured to detect a current state of machine 102, as well as future or subsequent machine states. For instance, system 188 can identify state transitions that are about to occur during operation of machine 102.

System 188 includes error detection logic 189, mission progress detection logic 190, and can include other items 191 as well. Error detection logic 189 is configured to detect errors or issues related to operation of machine 102 in the unmanned machine state. Mission progress detection logic 190 is configured to detect progress of machine 102, in completing the mission plan.

System 180 is configured to generate control signals to control machine state indicator mechanism(s) 170, discussed above. Illustratively, system 180 can include a visualization system 192 to visually communicate the detected machine state to operator 108. For instance, visualization system 192 can control lights on machine 102 to indicate a particular state of machine 102.

Similarly, an audible output system 194 can control mechanisms to indicate the detected machine state. For instance, system 194 can control speakers to generate an audible indication of a detected machine state (e.g., that the machine is current in, or about to enter, a particular machine state). System 180 can include other items as well. This is represented by block 196.

Figure 2:
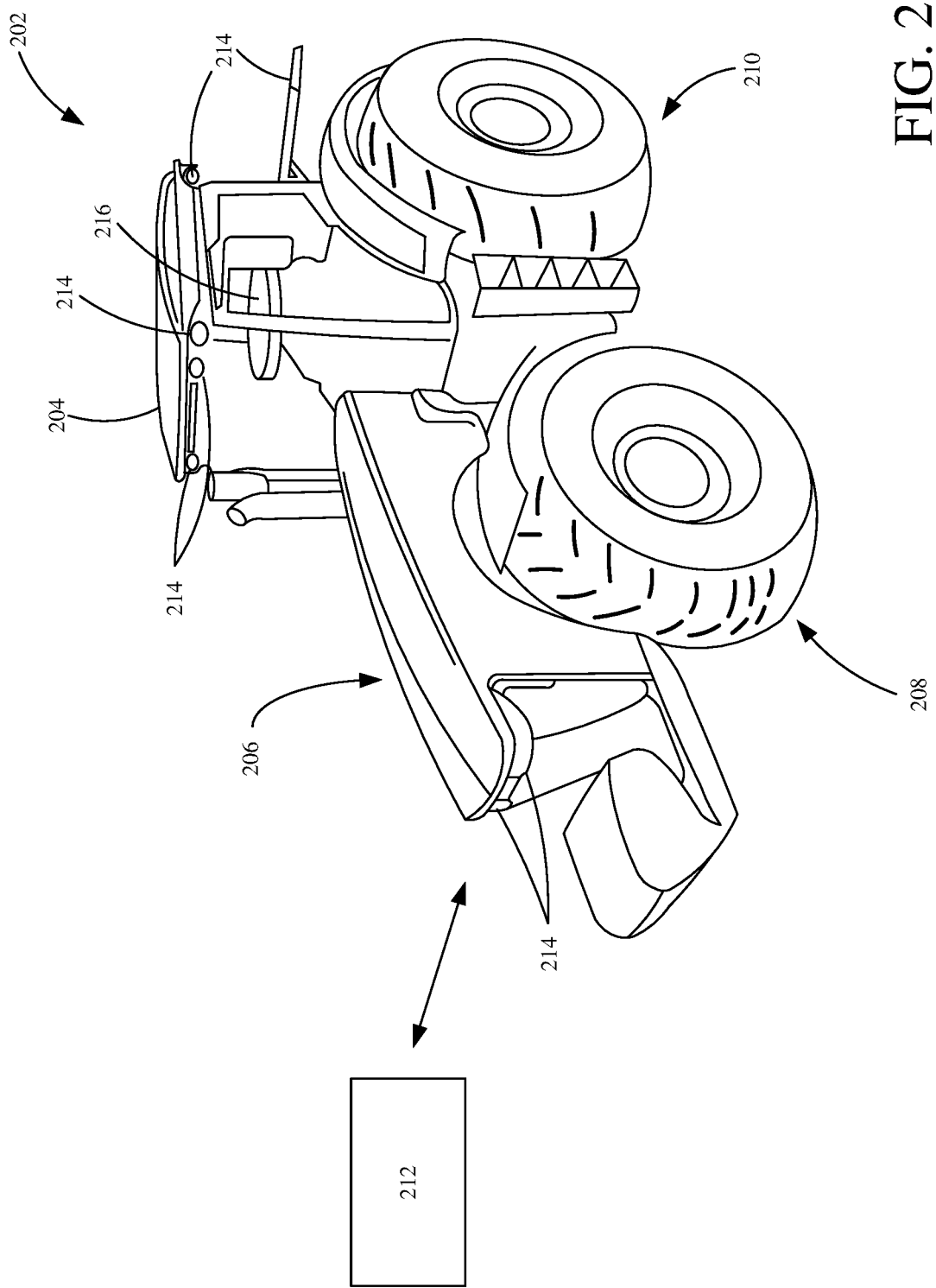
FIG. 2 illustrates one example of a mobile work machine.

Before discussing machine state system 180 in further detail, examples of mobile work machines will be discussed with respect to FIGS. 2-5. As noted above, mobile work machines can take a wide variety of different forms. FIG. 2 illustrates one example of a mobile work machine 202, in the form of an agricultural machine (illustratively a tractor).

Machine 202 includes an operator cab or other compartment 204, an engine or motor 206, a front axle and wheels 208, and a rear axle and wheels 210. Machine 202 includes a control system 212 (e.g., system 104 illustrated in FIG. 1). System 212 can include an object detection system configured to detect objects in proximity to machine 202 and an unmanned machine state system (e.g., system 180). Machine 202 includes a number of visual indicators, in the form of exterior lights 214 that are outside, or exterior to, operator compartment 204. Also, as illustrated in FIG. 2, machine 202 includes a visual indicator mechanism, in the form of a lighting assembly 216 that is located in operator compartment 204. Examples of lighting assembly 216 are discussed in further detail below. Briefly, however, lighting assembly 216 is located inside operator compartment 204 and is thus protected from environmental conditions (e.g., rainfall, wind, hail, etc.). Also, lighting assembly 216 is protected by operator compartment 204 from damage during pressure washing of machine 202, or other similar conditions. Lighting assembly 216 is controlled by an unmanned machine state system (e.g., system 180) to visually indicate the machine state of machine 202.

In one example, lighting assembly 216 is a "multi-color" lighting assembly configured to generate multiple different light colors, to indicate various states. For instance, lighting assembly 216 can include multiple colored lights and/or a light indicator configured to generate multiple colors.

Figure 3:
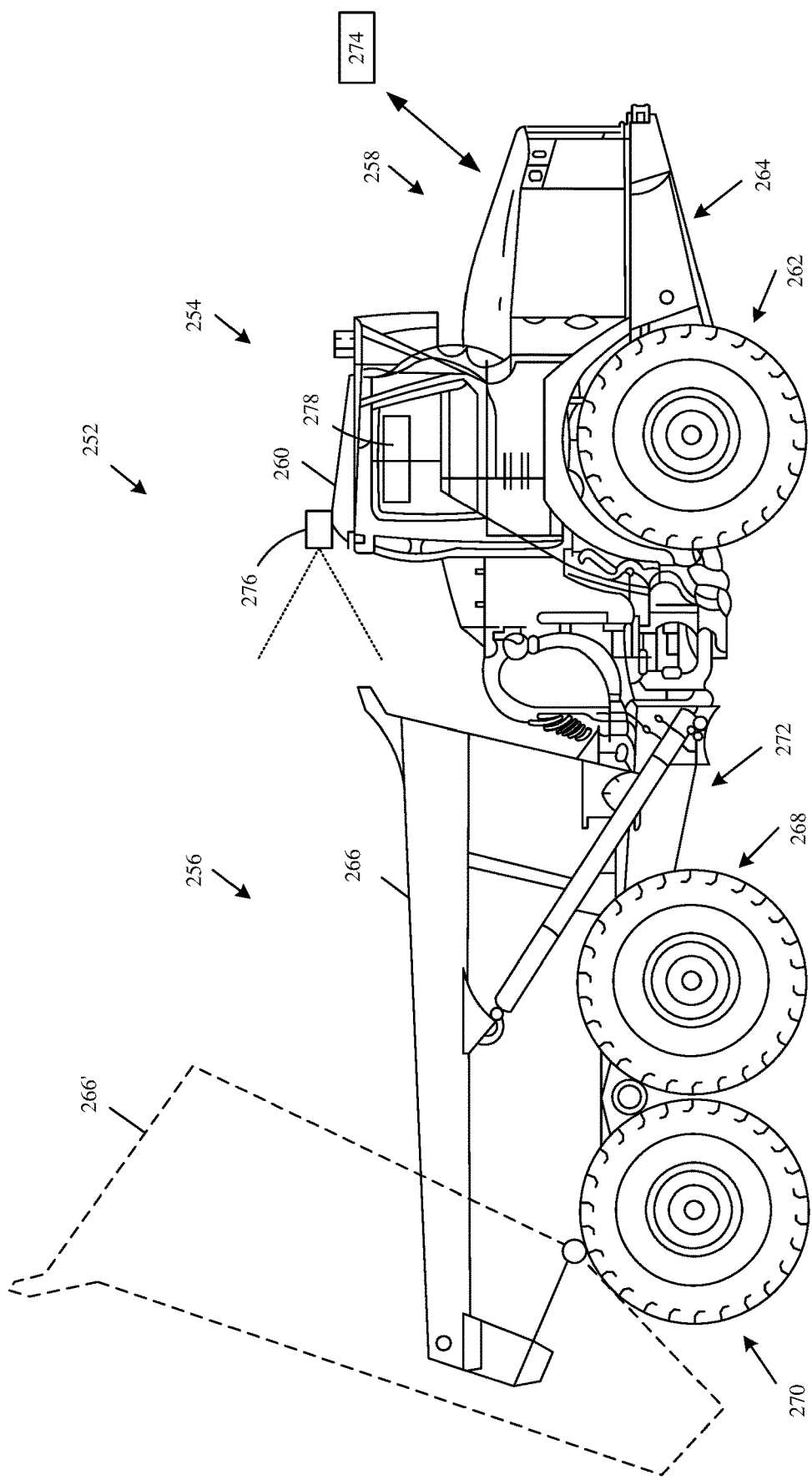
FIG. 3 illustrates one example of a mobile work machine.

FIG. 3 illustrates another example of a mobile work machine 252, in the form of an off-road construction vehicle (illustratively a rear dump vehicle or truck). Machine 252 includes a power head section 254 and a load carrying section 256. The power head section 254 includes a vehicle engine or motor 258, an operator compartment 260 and a front axle and wheels 262 which are all coupled to a front frame 264. The load carrying section 256 includes a dump body 266, a first rear axle and wheels 268 and a second rear axle and wheels 270 which are all coupled to a rear frame 272. The dump body 266 is illustrated with dashed lines as dump body 266' when in the dump position.

Machine 252 includes a control system 274 (e.g., system 104). Control system 274 can include an object detection system configured to detect objects located in proximity to machine 252. In the illustrated example, system 274 receives signals from object detection sensor(s) 276 (e.g., sensor(s) 132). The components of system 274 communicate over a CAN network of machine 252, in one example. Machine 252 can also include a visual state indicator 278 (such as lighting assembly 216) within operator compartment 260.

Figure 4:
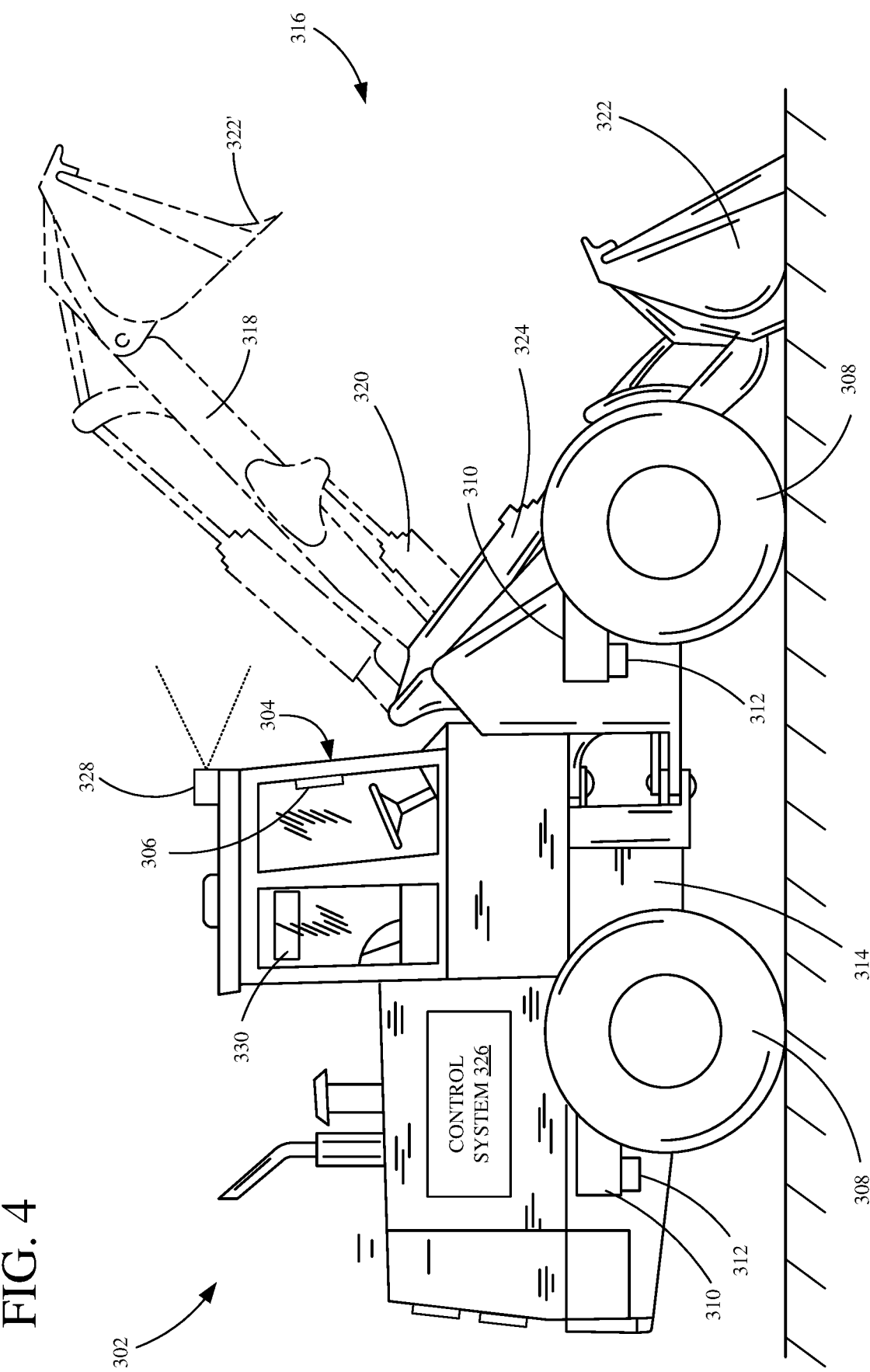
FIG. 4 illustrates one example of a mobile work machine.

FIG. 4 illustrates another example of a mobile work machine 302, in the form of an off-road construction vehicle (illustratively a front or wheel loader). Machine 302 includes an operator compartment 304 having a display device 306, ground-engaging element(s) 308 (e.g., wheels), motor(s) 310, speed sensor(s) 312, a frame 314, and a boom assembly 316. Boom assembly 316 includes a boom 318, a boom cylinder 320, a bucket 322 and a bucket cylinder 324. Boom 318 is pivotally coupled to frame 314 and may be raised and lowered by extending or retracting boom cylinder 320. FIG. 3 illustrates bucket 322 in an unloading or dump position 322'.

Bucket 322 is pivotally coupled to boom 318 and may be moved through an extension or retraction of bucket cylinder 324. During operation, mobile machine 302 can be controlled by an operator within operator compartment 304 in which mobile machine 302 can traverse a worksite. In one example, each one of motor(s) 310 are illustratively coupled to, and configured to drive, wheel(s) 308 of mobile machine 302. Speed sensor(s) 312 are illustratively coupled to each one of motor(s) 310 to detect a motor operating speed. Machine 302 includes a control system 326 (e.g., control system 104). Control system 326 can include an object detection system configured to detect objects located in proximity to machine 302. In the illustrated example, system 326 receives signals from object detection sensor(s) 328 (e.g., sensor(s) 132). Machine 302 can also include a visual state indicator 330 (such as lighting assembly 216) within operator compartment 304.

Figure 5:
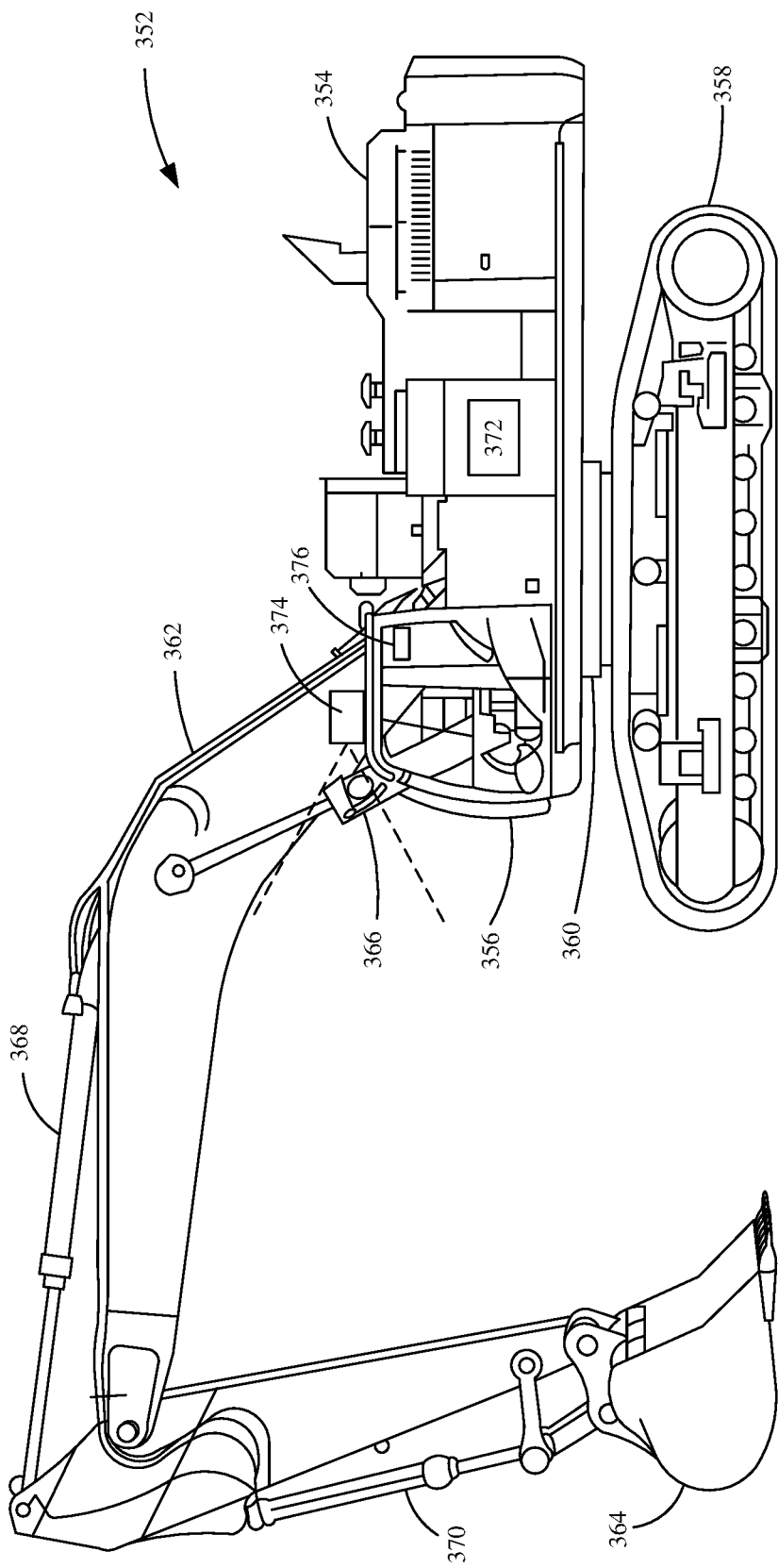
FIG. 5 illustrates one example of a mobile work machine.

FIG. 5 illustrates another example of a mobile work machine 352, in the form of an off-road construction vehicle (illustratively a hydraulic excavator). Machine 352 includes a house 354 having an operator compartment 356 rotatably disposed above tracked portion 358. House 354 may rotate three-hundred sixty degrees about tracked portion 358 via rotatable coupling 360. A boom 362 extends from house 354 and includes a bucket 364. Boom 362 can be moved (e.g., raised or lowered) by actuation of hydraulic cylinders 366, 368, 370.

Machine 352 includes a control system 372. Control system 372 can include an object detection system configured to detect objects located in proximity to machine 352. In the illustrated example, system 372 receives signals from object detection sensor(s) 374 (e.g., sensor(s) 132). Machine 352 can also include a visual state indicator 376 (such as lighting assembly 216) within operator compartment 356.

Figure 6:
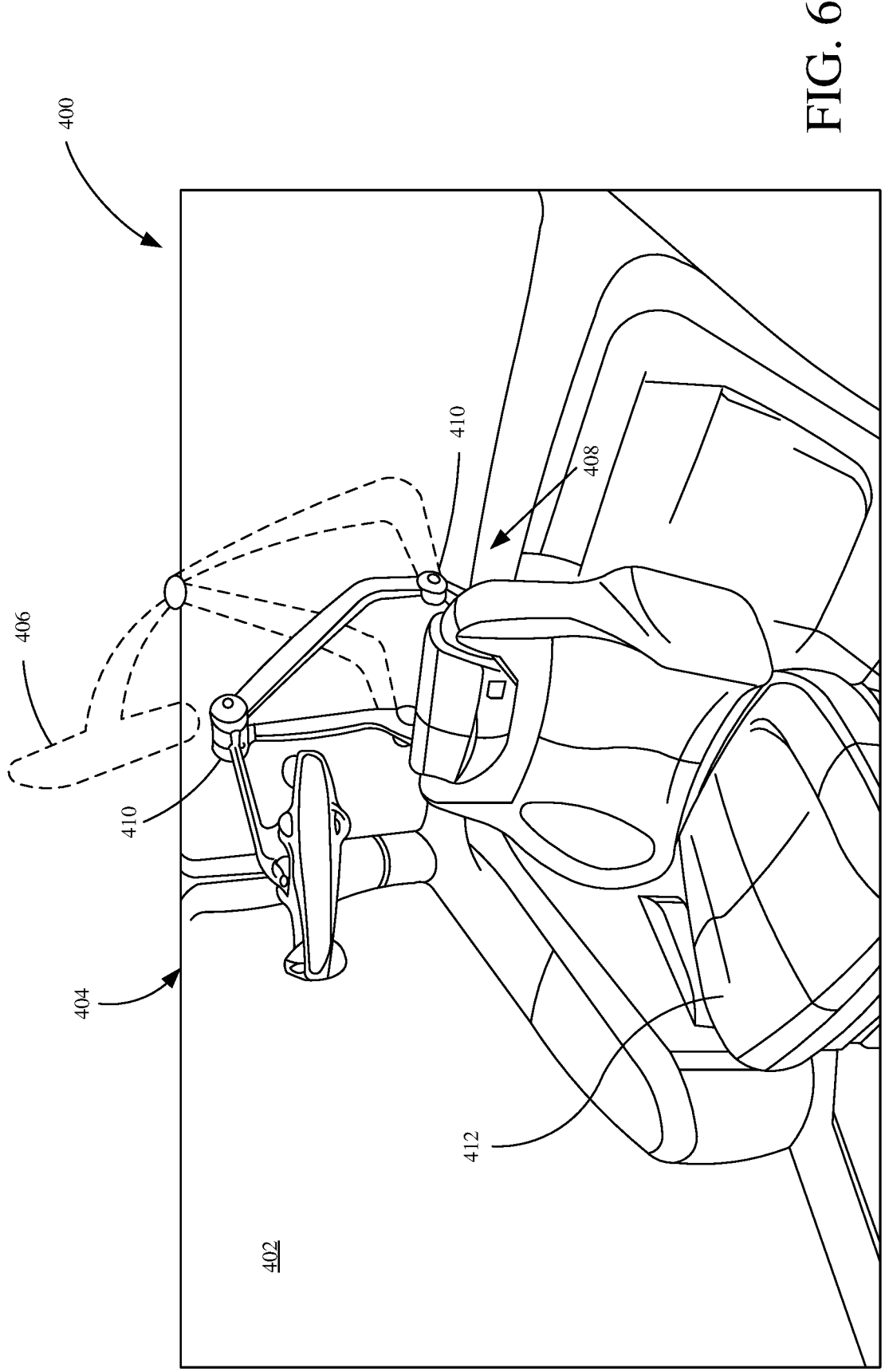
FIG. 6 illustrates one example of a visual machine state indicator mechanism located in an operator compartment.

FIG. 6 illustrates one example of a visual machine state indicator mechanism 400 located in an operator compartment 402 (such as compartments 260, 304, 356, etc.). Mechanism 400 includes a lighting assembly 404 movable between a deployed, or active, position, shown in FIG. 6, and a stowed, or inactive, position 406 (represented in FIG. 6 by dashed lines).

In the illustrated example, lighting assembly 404 using a mounting assembly 408 having one or more pivotable connections 410. Mounting assembly 408 is attached to a rear portion of an operator seat 412. In other examples, mounting assembly 408 can be attached to other portions of compartment 402, such as to the roof or ceiling of compartment 402. Assembly 404 is positioned such that the deployed position (shown in FIG. 6) prevents, or at least hinders, operator 108 from sitting in seat 412 during normal manned operation. In other words, in this example, the positioning of lighting assembly 404 requires that assembly 404 is moved to the stowed, or inactive, position when operator 108 manually controls the machine from compartment 402 (e.g., is seated in the operator seat). Assembly 404 is manually movable by the operator, when operator 108 leaves and enters the operator compartment. Alternatively, or in addition, assembly 404 can include actuator(s) that automatically move assembly 404 between the stowed and deployed positions.

In an example manual operation, operator 108 operates machine 102 from compartment 402, while seated in operator seat 412. At some point, operator 108 exits compartment 402. In doing so, operator 108 moves lighting assembly 404 from the stowed position 406 to the deployed or active position, which activates machine state system 180 to place machine 102 in an automated or unmanned machine state and to control lighting assembly 404. Alternatively, or in addition, machine 102 can be placed in the automated or unmanned machine state, in which lighting assembly 404 is controlled, through operator activation of a button, switch, or other input mechanism.

In an example automatic operation, when machine state system 180 detects that machine 102 has entered an automated or unmanned machine mode, control system 104 operates actuators to move lighting assembly to the deployed position. Similarly, when machine state system 180 detects that machine 102 exits the automated or unmanned machine mode, control system 104 operates actuators to move lighting assembly to the stowed position.

Figure 7:
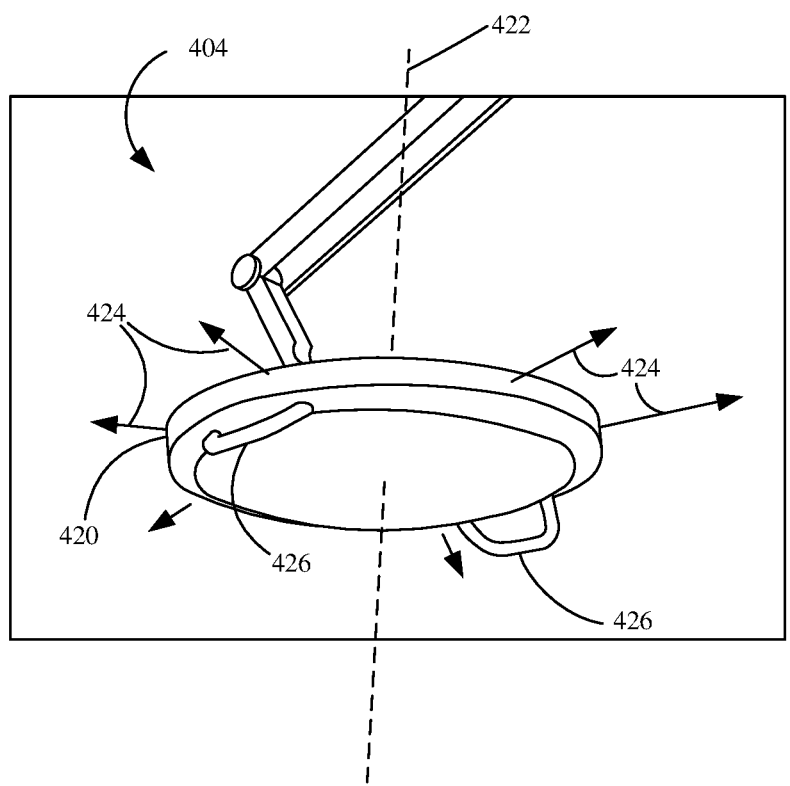
FIG. 7 is a perspective view of a lighting assembly, in one example.
Figure 8:
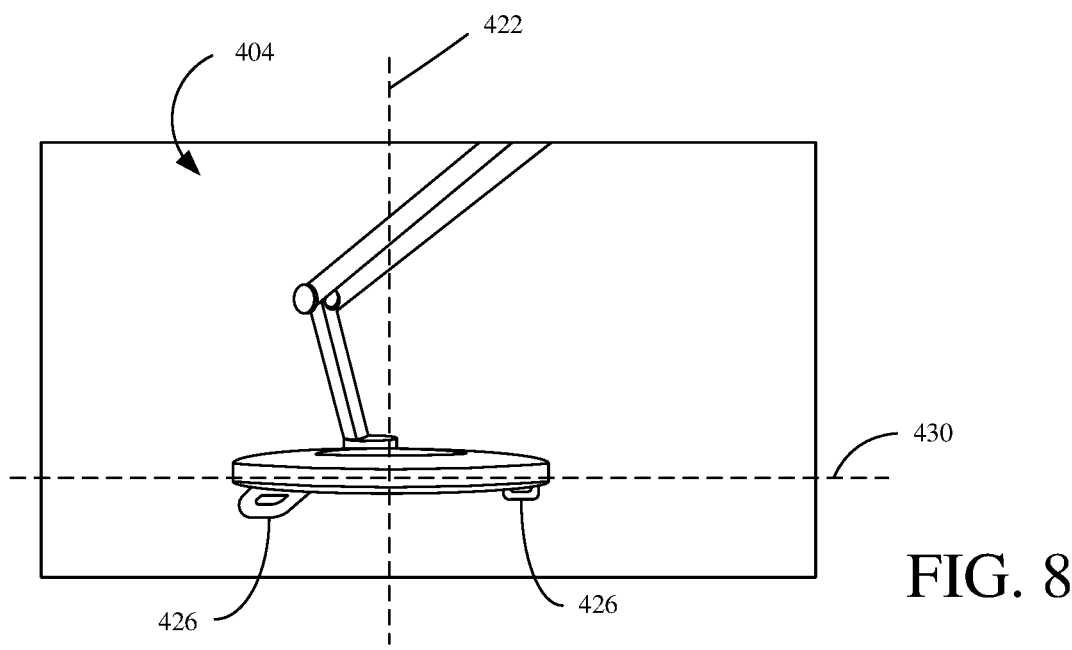
FIG. 8 is a side elevation view of the lighting assembly in FIG. 7.

FIGS. 7-10 illustrate one example of lighting assembly 404. FIG. 7 is a bottom perspective view and FIG. 8 is a side elevation view. As shown, lighting assembly 404 is configured to emit light from an outer perimeter 420 in substantially (i.e., at or near) three hundred and sixty degrees about vertical axis 422. This is represented by arrows 424. Accordingly, light emitted from lighting assembly 404 can be seen in any direction around machine 102.

It is noted that in the present example lighting assembly 404 has a cylindrical or circular profile (i.e., a round body perimeter). Of course, lighting assembly 404 can have other forms. For example, lighting assembly 404 can have a square or rectangular profile. Lighting assembly 404 also includes handles 426 to facilitate operator movement of lighting assembly 404.

The profile of lighting assembly 404 enables viewing by workers on the worksite in substantially all directions. That is, workers that are in front, to the sides, and/or behind the machine can observe the state indicators from lighting assembly 404.

In one example, outer perimeter 420 includes a surface that is transparent. In another example, the outer surface is semi-transparent (e.g., hazy or frosted glass) to allow light generated by light emitting elements (such as light emitting diodes (LEDs), etc.) to pass therethrough, while obscuring the individual points of light. In this way, lighting assembly 404 has a glowing appearance.

Figure 9:
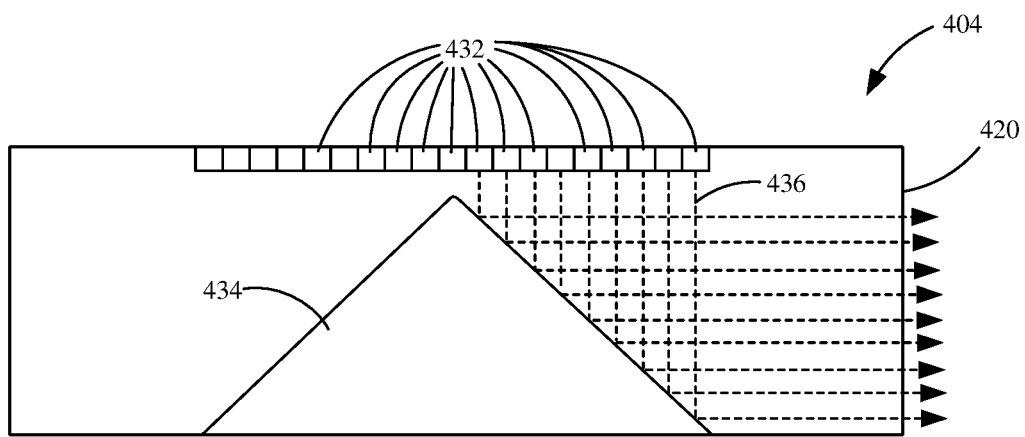
FIGS. 9 and 10 are cross-sectional schematic illustrations of the lighting assembly shown in FIG. 8.
Figure 10:
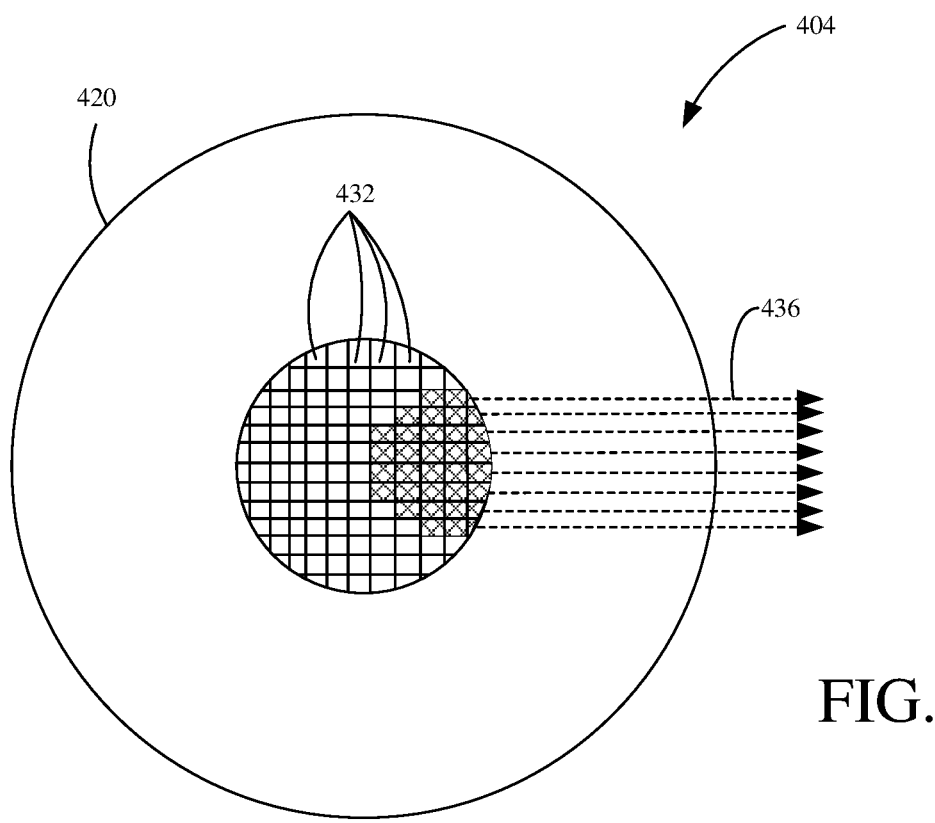

FIG. 9 is a cross-sectional schematic illustration of lighting assembly 404 along a plane through axis 422. FIG. 10 is a cross-sectional schematic illustration along line 430 shown in FIG. 8.

As shown in FIG. 9, lighting assembly 404 includes a plurality of LEDs 432, that are independently controllable, and each configured to output multiple colors at varying intensities. LEDs 432 are configured to emit light towards a reflective surface 434, illustratively a cone-shaped reflector, configured to reflect the light (represented by dashed lines 436) through the transparent or semi-transparent surface 420.

Figures 1, 11:
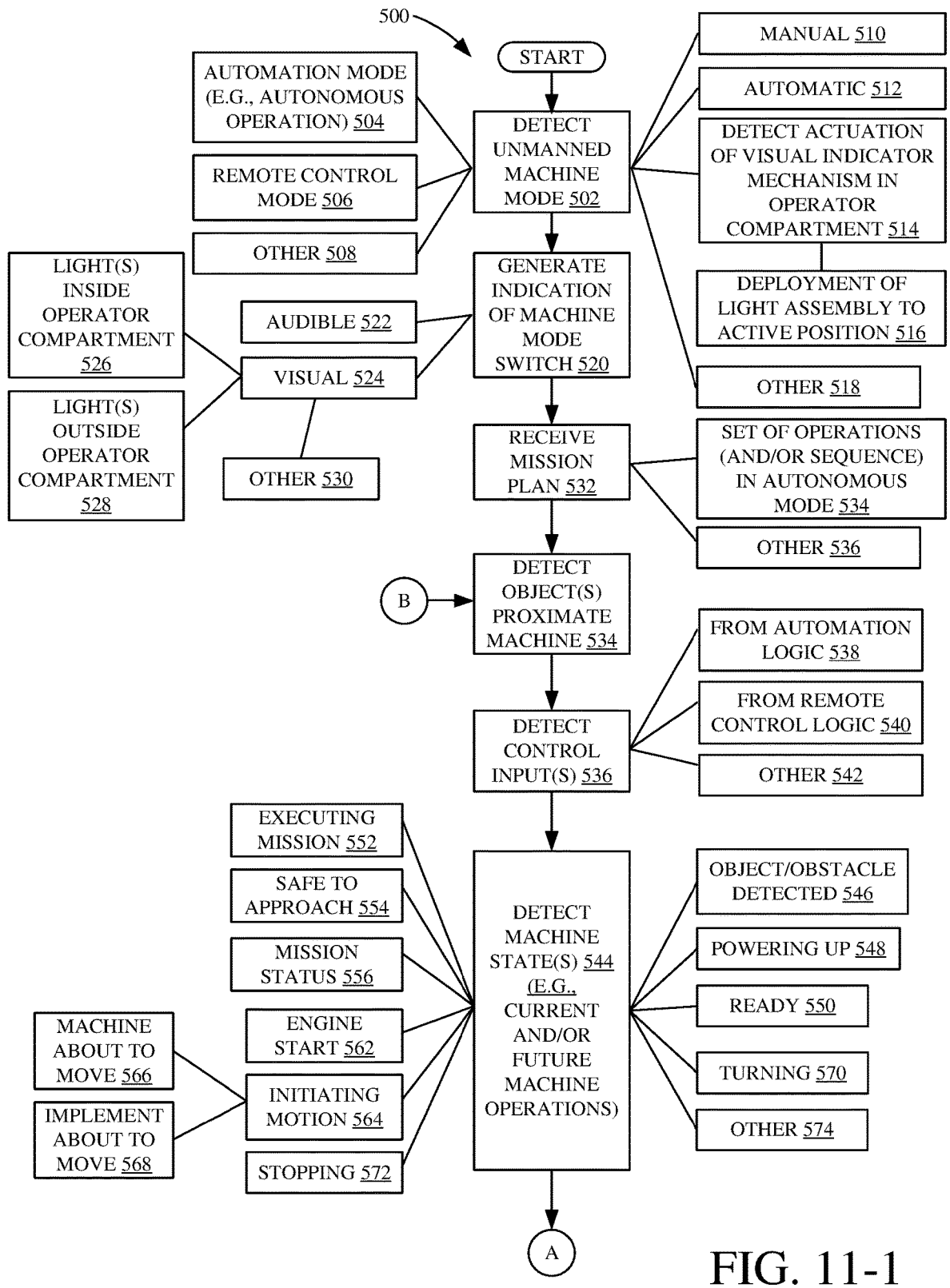
Figures 2, 11:
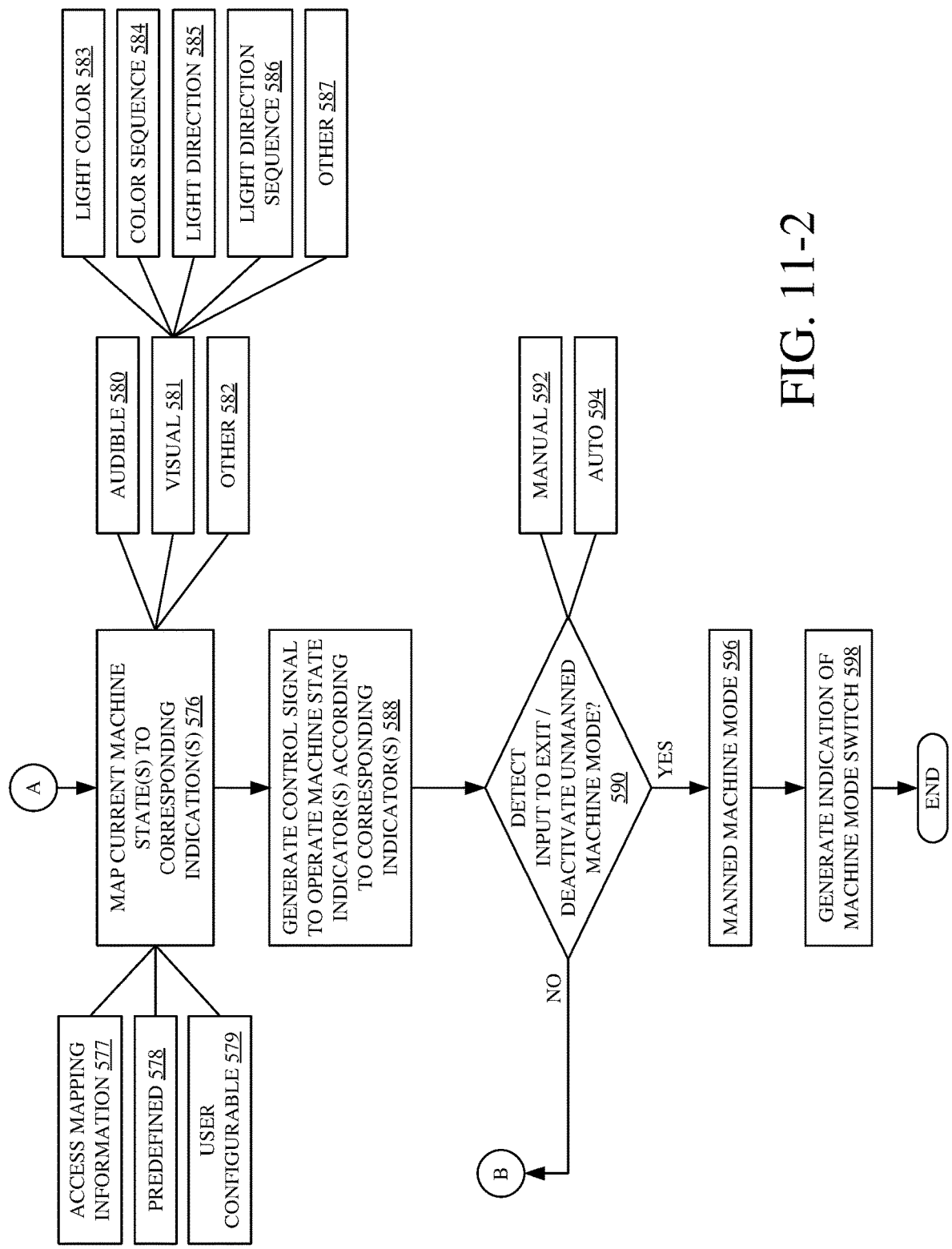

FIGS. 11-1 and 11-2 (collectively referred to as FIG. 11) provide a flow diagram 500 illustrating an example operation of an unmanned machine state system to detect and visualize machine states. For sake of illustration, but not by limitation, FIG. 11 will be described in the context of system 180, illustrated in FIG. 1, controlling machine 202 illustrated in FIG. 2.

At block 502, system 181 detects an input to enter an unmanned machine mode. As noted above, an unmanned machine mode can include an automation mode, such as autonomous operation of machine 202. This is represented at block 504. Alternatively, or in addition, an unmanned machine mode can include a remote control mode. This is represented at block 506. Of course, an unmanned machine mode can include other types of modes. This is represented at block 508. In any of these cases, operator 108 is outside of operator compartment 204 during the unmanned machine mode.

The detection at block 502 can be based on manual input received by operator 108. This is represented at block 510. For example, operator 108 can actuate a button, switch, or other operator interface mechanism 110 to activate mode switching logic 182. Alternatively, or in addition, the detection can be done automatically. This is represented at block 512.

In one example, system 180 can detect that operator 108 is no longer present in compartment 204. Alternatively, or in addition, the unmanned machine mode can be detected based on actuation of a visual indicator mechanism in the operator compartment (represented by block 514). In the example illustrated in FIG. 6, this includes the operator physically moving lighting assembly 404 from the stowed position 406 to the active position. This is represented at block 516. Of course, the unmanned machine mode can be detected in other ways as well. This is represented at block 518.

At block 520, an indication of the machine mode switch is generated. The indication can be communicated to operator 108 or others in proximity to machine 202, to indicate that the machine has been switched into the unmanned machine mode. This can include an audible indication, which is represented at block 522. For example, a horn and/or speaker on machine 202 can be activated to generate an indication of the unmanned machine mode. Alternatively, or in addition, a visual indication can be generated at block 524. For instance, lights inside operator compartment 204 (e.g., lighting assembly 216) can be activated, such as by flashing the lights to indicate the mode switch. This is represented at block 526. Also, lights outside operator compartment 204 can be activated. For instance, this can include flashing one or more of lights 214 illustrated in FIG. 2. This is represented at block 528. Of course, other visual indications can be generated as well. This is represented at block 530.

At block 532, a mission plan can be received by mission plan logic 186. In one example, a mission plan defines a set of operations and/or sequence information for that set of operations, to be performed in the unmanned machine mode. This is represented at block 534. For instance, the sequence information can indicate a sequence in which the set of operations is to be performed. Also, the sequence information can identify prerequisite conditions that must be met before subsequent step(s) in the sequence can be initiated or performed. Mission plans can be defined in other ways as well. This is represented at block 536.

It is noted that the mission plan can be received or obtained in any of a number of ways. In one example, logic 190 can be configured to generate the mission plan, for example based on input from operator 108. In another example, a mission plan can be received from remote system 114.

At block 534, object detection system 126 detects objects that are proximate to machine 202. This can include operator 108, workers on the worksite, work materials, other machines, devices, systems, to name a few. Detected object information can be stored in data store 128, and can identify any of a variety of characteristics of the detected objects, such as their relative position to machine 102, their size, shape, object type, etc.

At block 536, control inputs are detected to control machine 102. For instance, the control inputs provided to control system 104, or generated by control system 104, that indicate actions for controllable subsystems 106. For instance, control inputs can be received from automation logic 183. This is represented at block 538. In another example, the control inputs can be received from remote control logic 184. This is represented at block 540. Of course, control inputs can be detected in other ways as well. This is represented at block 542.

At block 544, a machine state is detected. An example machine state can represent or indicate a current operation being performed by machine 202, a future or subsequent operation to be performed by machine 202, a predicted or expected operation of machine 202, etc. A machine state can be based on the detected object(s) at block 534 and/or the control input(s) at block 536.

For sake of illustration, but not by limitation, a machine state indicates the presence of an object or obstacle proximate machine 202. This is represented at block 546. Also, a machine state can indicate that the machine is powering up and/or getting ready to perform operations. This is represented by block 548. A machine state can also include a ready state (block 550), that machine 202 is executing the mission plan (block 552), that machine 202 is safe for operator 108 (or others) to approach machine 202 (block 554), and/or or a status of the mission plan (block 556). A machine state can also indicate that engine 206 is about to start (block 562), and/or that machine motion is being initiated (block 564). For instance, a machine state can indicate that machine 202 is about to move (block 566) and/or that an implement associated with machine 202 is about to move (block 568). Also, block 560 can detect that machine 202 is about to turn (block 570), machine 202 is stopping (block 572), or any of a wide variety of other machine states. This is represented at block 574.

At block 576, the machine state detected at block 544 and/or at block 560 are mapped to corresponding indications to be rendered by mechanisms 170. In one example, mapping information is accessed at block 577. The mapping information can be pre-defined (block 578) and/or user configurable (block 579).

The indications to which the machine states are mapped can include audible indications (block 580), visual indications (block 581) or other indications (block 582). For instance, the audible indications can includes operating a horn or speakers on machine 202.

The visual indications at block 581 can include a particular light color (block 583). For instance, a first machine state (e.g., state A) can be mapped to a red indicator from lighting assembly 216, a second machine state (e.g., state B) can be mapped to a yellow indicator from lighting assembly 216, and machine state (e.g., state C) can be mapped to a green indicator from lighting assembly 216.

Also, the visual indications at block 581 can include a particular color sequence (block 584). For instance, a first machine state (e.g., state A) can be mapped to a single color blinking indicator from lighting assembly 216, a second machine state (e.g., state B) can be mapped to a solid color indicator from lighting assembly 216, and machine state (e.g., state C) can be mapped to an indicator that transitions between two or more different colors.

Also, the visual indication at block 581 can include a particular light direction (block 585) or light direction sequence (block 586). For instance, for a detected object or issue state, lighting assembly 216 can be operated to generate a "focused" light that is directed toward the detected object or the source of detected issue. This can assist operator 108 in identifying a source of the detected machine state. In another example, a particular machine state is mapped to a visual indicator that rotates about three hundred and sixty degrees (or other angle) around machine 202.

Of course, other visual indications can be generated as well. This is represented at block 587.

At block 588, a control signal is generated to operate machine state indicator mechanism(s) 170 according to the corresponding indications, identified based on the mapping at block 576. At block 590, the operation determines whether an input is detected to exit or deactivate the unmanned machine mode. For instance, this input can be manual (block 592), automatic (block 594), or a combination of manual and automatic processes. In one example, detection at block 590 includes detecting that operator 108 has moved lighting assembly 404 from the active position shown in FIG. 6 to the stowed position 406.

If no input is detected, operation returns to block 534 to detect any objects, control inputs, and states. If the input at block 590 is detected, operation proceeds to block 596 in which mode switching logic 182 switches machine 102 to the manned machine mode. An indication of the machine mode switch is generated at block 598. Examples of such indications are described above with respect to block 520.

Figure 12:
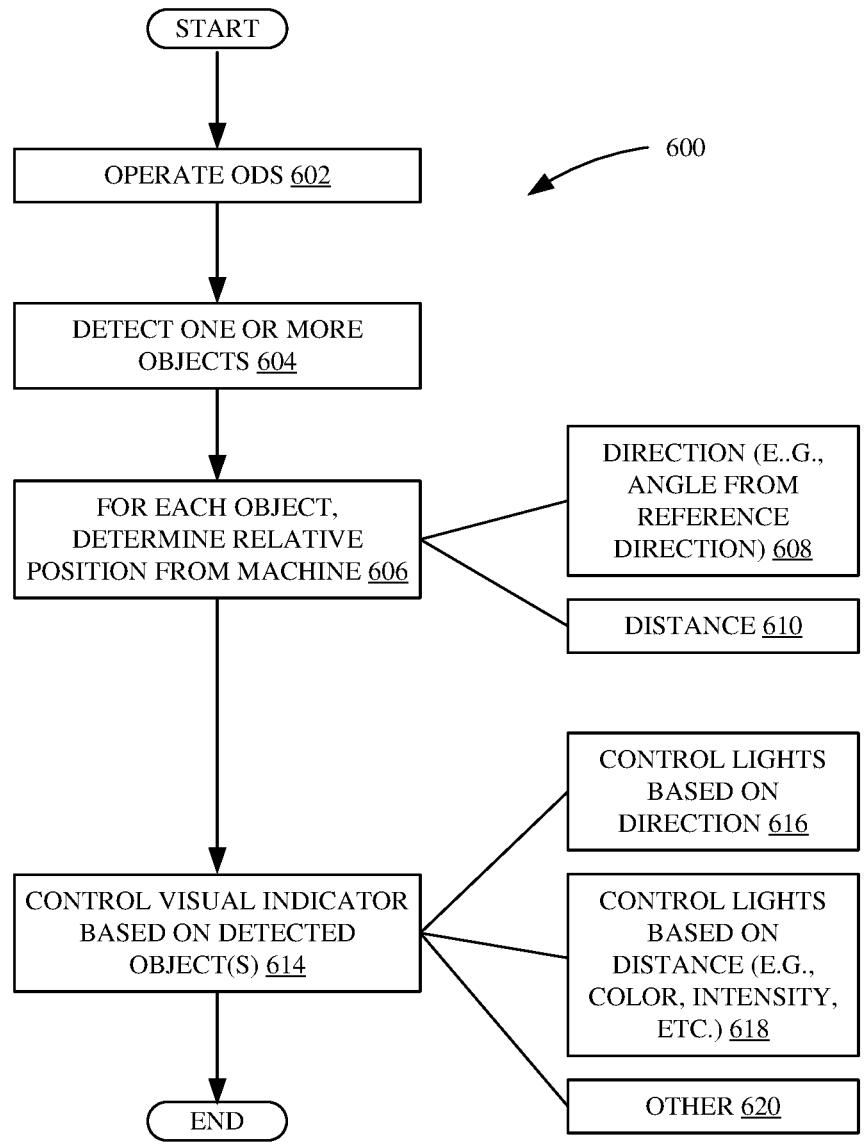
FIG. 12 is a flow diagram illustrating an example operation of detecting objects proximate to a mobile work machine.

FIG. 12 illustrates an example operation of detecting objects proximate to a mobile work machine and visualizing the detected machine state. For sake of illustration, but not by limitation, FIG. 12 will be described in the context of system 180, illustrated in FIG. 1, controlling machine 202 illustrated in FIG. 2.

At block 602, object detection system 126 is operated. This can include activating object detection sensors 132. At block 604, one or more objects proximate to machine 202 are detected. At block 606, a relative position from machine 202 is determined for each object. This can include, for example, a direction of the object (block 608) and/or a distance (block 610) of the object from machine 202.

At block 614, a visual indicator is controlled based on the detected objects. For example, lights on machine 202 are controlled based on the direction of the detected object. For instance, as shown in the example of FIGS. 9 and 10, particular light emitting components can be activated to emit light in a particular direction towards the area of the worksite corresponding to the detected object. Thus, operator 108 can identify the direction of the object from machine 202 by looking at lighting assembly 216.

In one example, the lights are controlled on the distance of the detected object from machine 202. For instance, the color and/or intensity of the light can be varied based on the object distance. This is represented at block 618. Of course, a visual indicator can be controlled in other ways as well. This is represented at block 620.

It can thus be seen that the present discussion provides a number of advantages and enhances a mobile work machine environment. In described examples, an unmanned machine state system provides a robust communication framework between unmanned work machines (e.g., operating autonomously or in a remote-controlled mode) and human bystanders on the worksite. This can enhance worksite safety, as well as operational efficiency, through the visualization of machine state(s). Further, in described examples, a multi-color lighting assembly is located in the operator compartment where it is both highly visible (e.g., at a location where a bystander would normally look for visual communication with the operator, provides indications in three hundred sixty degrees, etc.), and is protected from environmental conditions which may otherwise damage or hinder operation or visibility of the lighting assembly.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
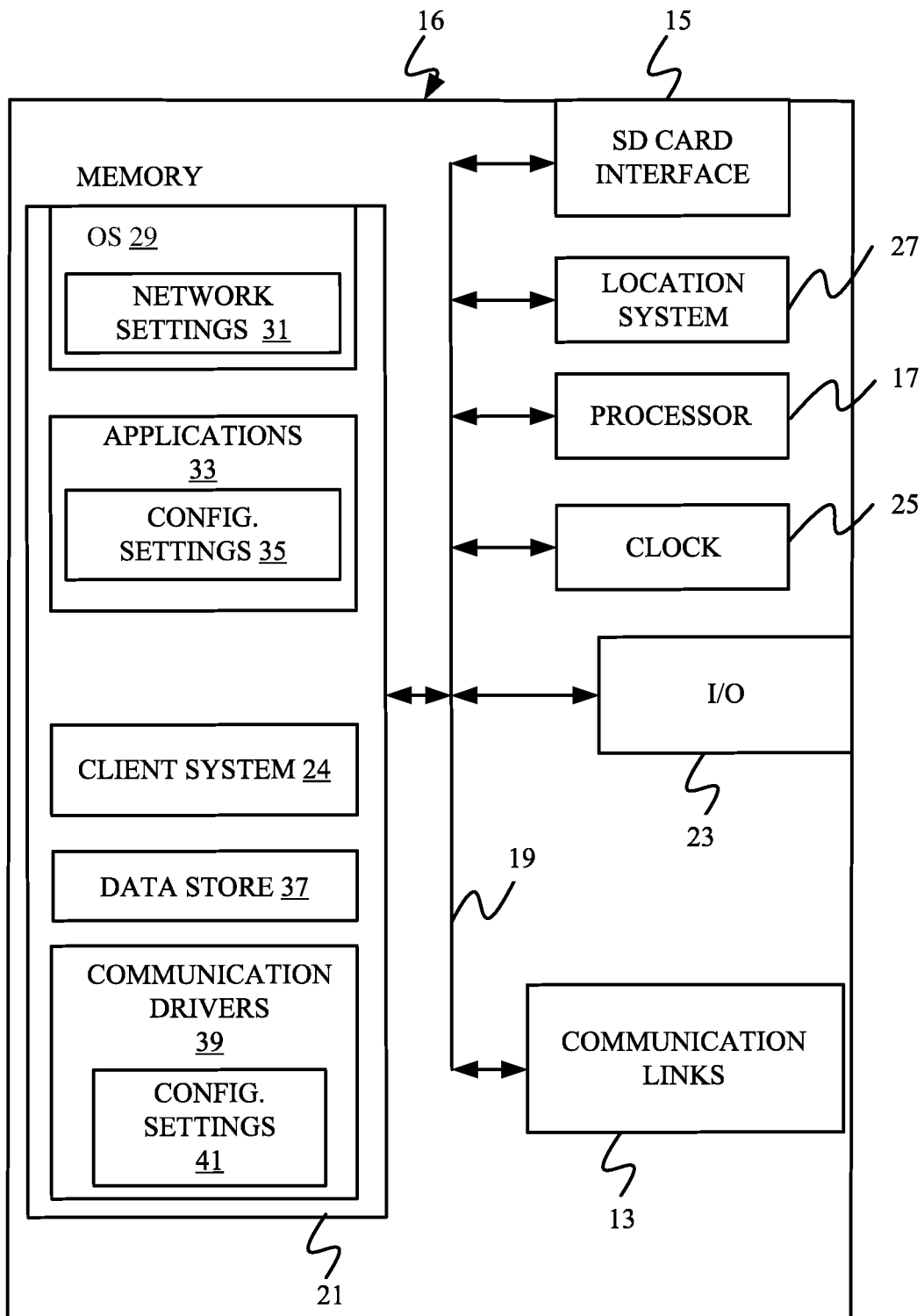
FIG. 13 shows an example of a mobile device that can be used in the architecture(s) shown in the previous figures.

FIG. 13 is a simplified block diagram of one illustrative example of a handheld or mobile computing device that can be used as a user's or client's hand-held device 16, in which the present system (or parts of it) can be deployed. For instance, a mobile device can be deployed in the operator compartment of work machine 102 or as remote system 114.

FIG. 13 provides a general block diagram of the components of device 16 that can run some components shown in FIG. 1, that interacts with them, or both. In device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

VO components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of device 16 include, but are not limited to, a smart phone or tablet computer having a user interface display screen, such as a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. The computer can also illustratively receive voice inputs as well. Of course, of forms of devices 16 are possible.

Figure 14:
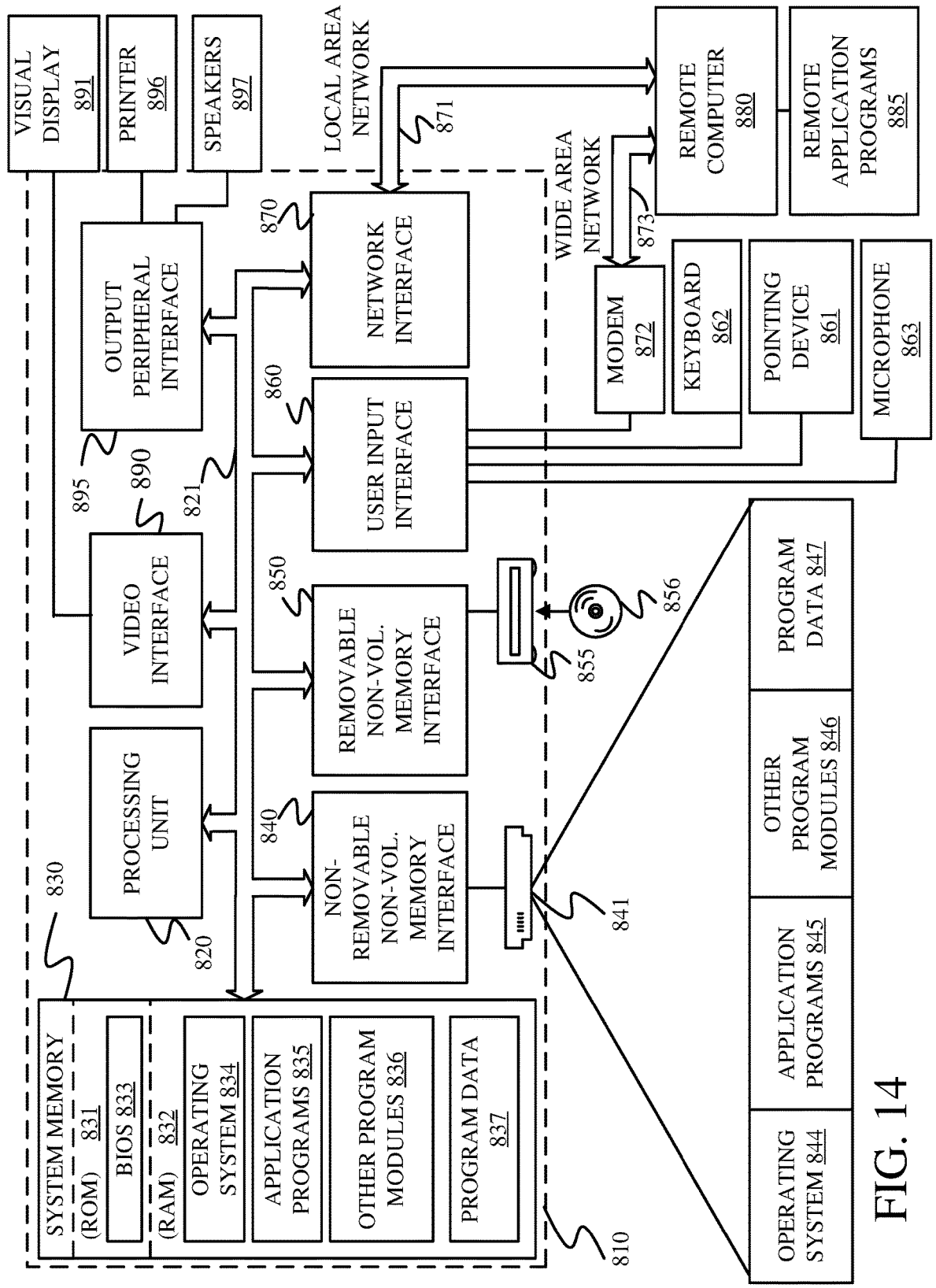
FIG. 14 is a block diagram showing one example of a computing environment that can be used in the architecture(s) shown in the previous figures.

FIG. 14 is one example of a computing environment in which elements of FIG. 1, or parts of it, (for example) can be deployed. With reference to FIG. 14, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile work machine comprising:
an operator compartment comprising an operator interface mechanism configured to receive operator input;
a control system configured to generate a control signal to control the mobile work machine in an unmanned operation mode;
a machine state detection system configured to detect a machine state of the mobile work machine in the unmanned operation mode; and
a visualization system configured to control a visual indicator mechanism in the operator compartment to generate a visual indication of the detected machine state.

Example 2 is the mobile work machine of any or all previous examples, wherein the visual indicator mechanism comprises a multi-color lighting assembly.

Example 3 is the mobile work machine of any or all previous examples, wherein the multi-color lighting assembly is movable between a first position and a second position.

Example 4 is the mobile work machine of any or all previous examples, wherein the visualization system is configured to control the multi-color lighting assembly based on whether the multi-color lighting assembly is in the second position.

Example 5 is the mobile work machine of any or all previous examples, and further comprising:
mode switching logic configured to initiate the unmanned operation mode based on detecting that the multi-color lighting assembly is in the second position.

Example 6 is the mobile work machine of any or all previous examples, wherein, when in the second position, the multi-color lighting assembly is located above an operator seat in the operator compartment.

Example 7 is the mobile work machine of any or all previous examples, wherein the visual indication generated by the visual indicator mechanism is visible from positions on the worksite outside the operator compartment in substantially three hundred and sixty degrees.

Example 8 is the mobile work machine of any or all previous examples, and further comprising:
an object detection system configured to detect an object on the worksite, and the machine state comprises an object detection state corresponding to the detected object.

Example 9 is the mobile work machine of any or all previous examples, wherein the visualization system is configured to generate the visual indication to indicate a direction of the detected object relative to the mobile work machine.

Example 10 is the mobile work machine of any or all previous examples, wherein the machine state comprises a mission plan execution state, and the control system is configured to control the mobile work machine in accordance with a mission plan that defines a set of worksite operations.

Example 11 is the mobile work machine of any or all previous examples, wherein the machine operation comprises an initiation of motion of a controllable subsystem of the mobile work machine.

Example 12 is a mobile work machine comprising:
an operator compartment comprising an operator interface mechanism configured to receive operator input;
a visual indicator mechanism located in the operator compartment and movable between a first position and a second position;
a machine state detection system configured to detect a machine state of the mobile work machine; and a visualization system configured to control the visual indicator mechanism to generate a visual indication of the detected machine state.

Example 13 is the mobile work machine of any or all previous examples, wherein the visual indicator mechanism comprises a multi-color lighting assembly, and, when in the second position, the multi-color lighting assembly is located over an operator seat in the operator compartment.

Example 14 is the mobile work machine of any or all previous examples, and further comprising a control system configured to activate an unmanned operation mode based on movement of the visual indicator mechanism to the second position.

Example 15 is the mobile work machine of any or all previous examples, and further comprising:
mode switching logic configured to initiate an unmanned operation mode based on detecting that the visual indicator mechanism is in the second position.

Example 16 is the mobile work machine of any or all previous examples, wherein the visual indication generated by the visual indicator mechanism is visible from positions on the worksite outside the operator compartment in substantially three hundred and sixty degrees.

Example 17 is a mobile work machine comprising:
an operator compartment comprising an operator interface mechanism configured to receive operator input;
a control system configured to generate a control signal to control the mobile work machine in an unmanned operation mode on a worksite;
an object detection system configured to detect on object on the worksite during operation of the mobile work machine in the unmanned operation mode; and
a visualization system configured to control a visual indicator mechanism to generate a visual indication of the detected object.

Example 18 is the mobile work machine of any or all previous examples, wherein the visual indicator mechanism comprises a multi-color lighting assembly in the operator compartment.

Example 19 is the mobile work machine of any or all previous examples, wherein the visual indication generated by the multi-color lighting assembly is visible from positions on the worksite outside the operator compartment in substantially three hundred and sixty degrees.

Example 20 is the mobile work machine of any or all previous examples, wherein the multi-color lighting assembly is movable between a first position and a second position in which the multi-color lighting assembly is located above an operator seat in the operator compartment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
an operator compartment comprising an operator interface mechanism configured to receive operator input;
a visual indicator mechanism in the operator compartment;
a control system configured to generate a control signal to control the mobile work machine during an unmanned operation mode on a worksite in which the operator compartment is unmanned;
a machine state detection system configured to detect a machine state of the mobile work machine in the unmanned operation mode; and
a visualization system configured to control the visual indicator mechanism in the operator compartment to generate, during the unmanned operation in which the operator compartment is unmanned, a visual indication, of the detected machine state.

2. The mobile work machine of claim 1, wherein the visual indicator mechanism comprises a multi-color lighting assembly attached to a portion of the operator compartment.

3. The mobile work machine of claim 2, wherein the multi-color lighting assembly is movable between a first position and a second position.

4. The mobile work machine of claim 3, wherein the visualization system is configured to control the multi-color lighting assembly based on whether the multi-color lighting assembly is in the second position.

5. The mobile work machine of claim 4, and further comprising:
mode switching logic configured to initiate the unmanned operation mode based on detecting that the multi-color lighting assembly is in the second position.

6. The mobile work machine of claim 3, wherein, when in the second position, the multi-color lighting assembly is located above an operator seat in the operator compartment.

7. The mobile work machine of claim 1, wherein the visual indication generated by the visual indicator mechanism is visible from positions on the worksite outside the operator compartment in substantially three hundred and sixty degrees.

8. The mobile work machine of claim 1, and further comprising:
an object detection system configured to detect an object on the worksite, and the machine state comprises an object detection state corresponding to the detected object.

9. The mobile work machine of claim 8, wherein the visualization system is configured to generate the visual indication to indicate a direction of the detected object relative to the mobile work machine.

10. The mobile work machine of claim 1, wherein the machine state comprises a mission plan execution state, and the control system is configured to control the mobile work machine in accordance with a mission plan that defines a set of worksite operations.

11. The mobile work machine of claim 1, wherein the machine operation comprises an initiation of motion of a controllable subsystem of the mobile work machine.

12. A mobile work machine comprising:
an operator compartment comprising an operator interface mechanism configured to receive operator input;
a visual indicator mechanism supported in the operator compartment by a mounting assembly configured to move the visual indicator mechanism between a first position and a second position;
a machine state detection system configured to detect a machine state of the mobile work machine; and
a visualization system configured to control the visual indicator mechanism to generate a visual indication of the detected machine state.

13. The mobile work machine of claim 12, wherein the visual indicator mechanism comprises a multi-color lighting assembly, and, when in the second position, the multi-color lighting assembly is located over an operator seat in the operator compartment.

14. The mobile work machine of claim 12, and further comprising a control system configured to activate an unmanned operation mode based on movement of the visual indicator mechanism to the second position.

15. The mobile work machine of claim 12, and further comprising:
mode switching logic configured to initiate an unmanned operation mode based on detecting that the visual indicator mechanism is in the second position.

16. The mobile work machine of claim 12, wherein the visual indication generated by the visual indicator mechanism is visible from positions on the worksite outside the operator compartment in substantially three hundred and sixty degrees.

17. A mobile work machine comprising:
an operator compartment comprising an operator interface mechanism configured to receive operator input;
a control system configured to generate a control signal to control the mobile work machine in an unmanned operation mode on a worksite in which the operator compartment is unmanned;
an object detection system configured to detect on object on the worksite during operation of the mobile work machine in the unmanned operation mode; and
a visualization system configured to control a visual indicator mechanism to generate a visual indication of the detected object during, the unmanned operation in which the operator compartment is unmanned.

18. The mobile work machine of claim 17, wherein the visual indicator mechanism comprises a multi-color lighting assembly in the operator compartment.

19. The mobile work machine of claim 18, wherein the visual indication generated by the multi-color lighting assembly is visible from positions on the worksite outside the operator compartment in substantially three hundred and sixty degrees.

20. The mobile work machine of claim 18, wherein the multi-color lighting assembly is movable between a first position and a second position in which the multi-color lighting assembly is located above an operator seat in the operator compartment.

* * * * *